United States Patent [19]

Chapman

[11] Patent Number: 5,197,700
[45] Date of Patent: Mar. 30, 1993

[54] CAMERA PEDESTAL

[75] Inventor: Leonard T. Chapman, North Hollywood, Calif.

[73] Assignee: Leonard Studio Equipment, Inc., North Hollywood, Calif.

[21] Appl. No.: 591,525

[22] Filed: Oct. 1, 1990

[51] Int. Cl.⁵ .............................................. A47G 29/00
[52] U.S. Cl. ................................... 248/125; 248/669; 248/631; 352/243; 354/81
[58] Field of Search ............... 298/125; 248/631, 659, 248/161, 157, 186, 354.1, 162.1; 352/243; 354/81; 267/64.26, 118, 124

[56] References Cited

U.S. PATENT DOCUMENTS

| | | |
|---|---|---|
| 4,094,484 | 6/1978 | Galione . |
| 4,111,389 | 9/1978 | Gundlach et al. ............... 248/162.1 |
| 4,577,827 | 3/1986 | Eliscu ................. 354/81 X |
| 4,657,267 | 4/1987 | Jaumann et al. .................. 354/81 X |
| 4,697,773 | 10/1987 | Jaumann et al. ................. 248/162.1 |
| 4,757,970 | 7/1988 | Nakazawa et al. . |
| 5,028,037 | 7/1991 | Wang ............................ 267/64.26 X |

OTHER PUBLICATIONS

FGV Panther Brochure.
Cricket Camera Dolly Brochure.
Vinten Complete Range Catalogue.
Ladybird Elemack Brochure.

Primary Examiner—Ramon O. Ramirez
Attorney, Agent, or Firm—Lyon & Lyon

[57] ABSTRACT

A camera pedestal has a cylinder with a tapering cross-section for providing a uniform counterbalancing force using a compressed gas. Telescoping column sections which make up a column assembly have inner and outer slots for rollers. The column assembly is eccentrically positioned on its base tank. The pedestal is engageable to a receptacle on a camera dolly with a telescoping steering drive tube interconnecting a steering assembly on the pedestal with a steering system in the dolly.

14 Claims, 8 Drawing Sheets

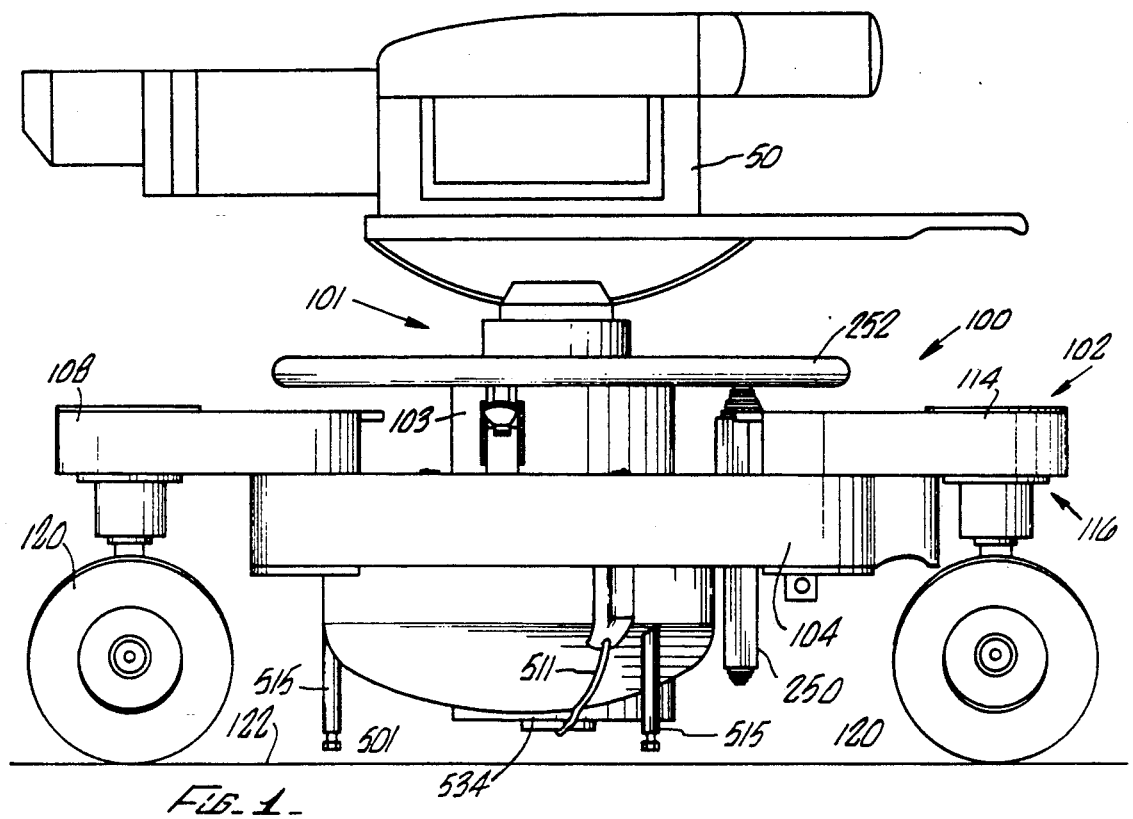
Fig_1_
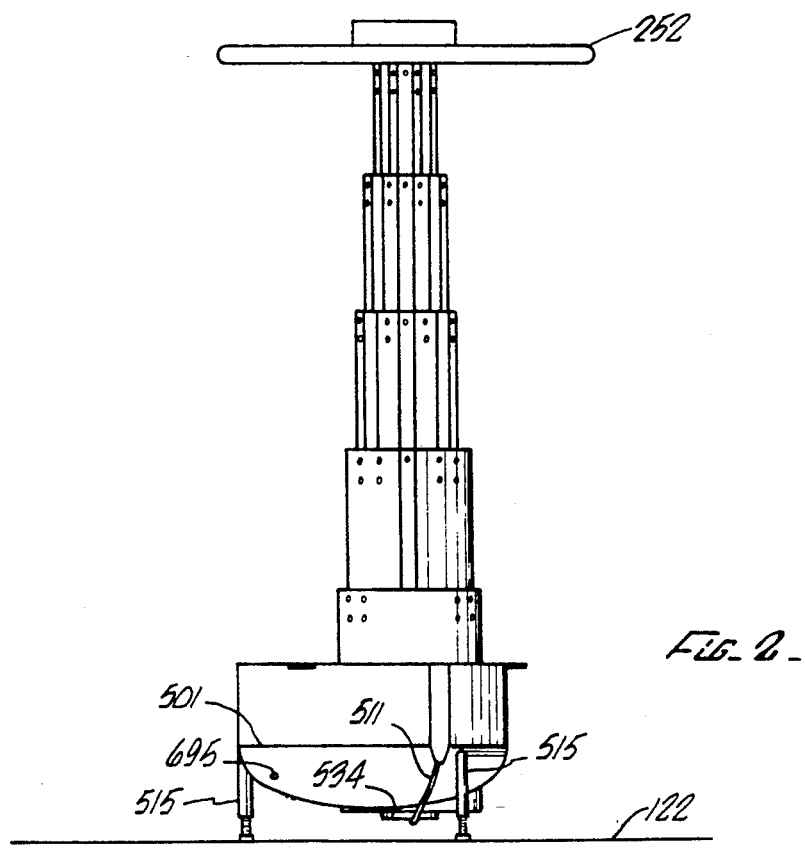
Fig_2_

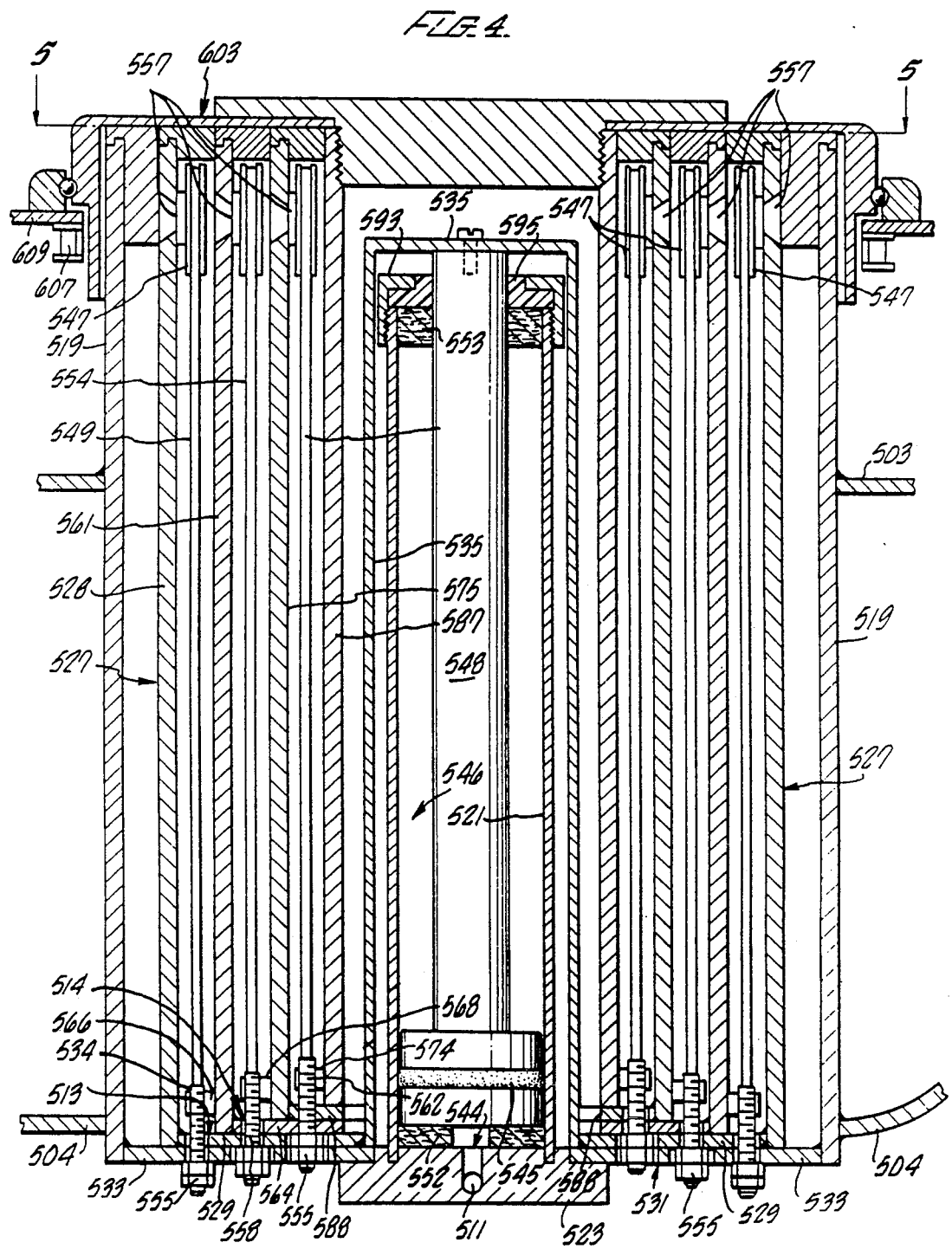

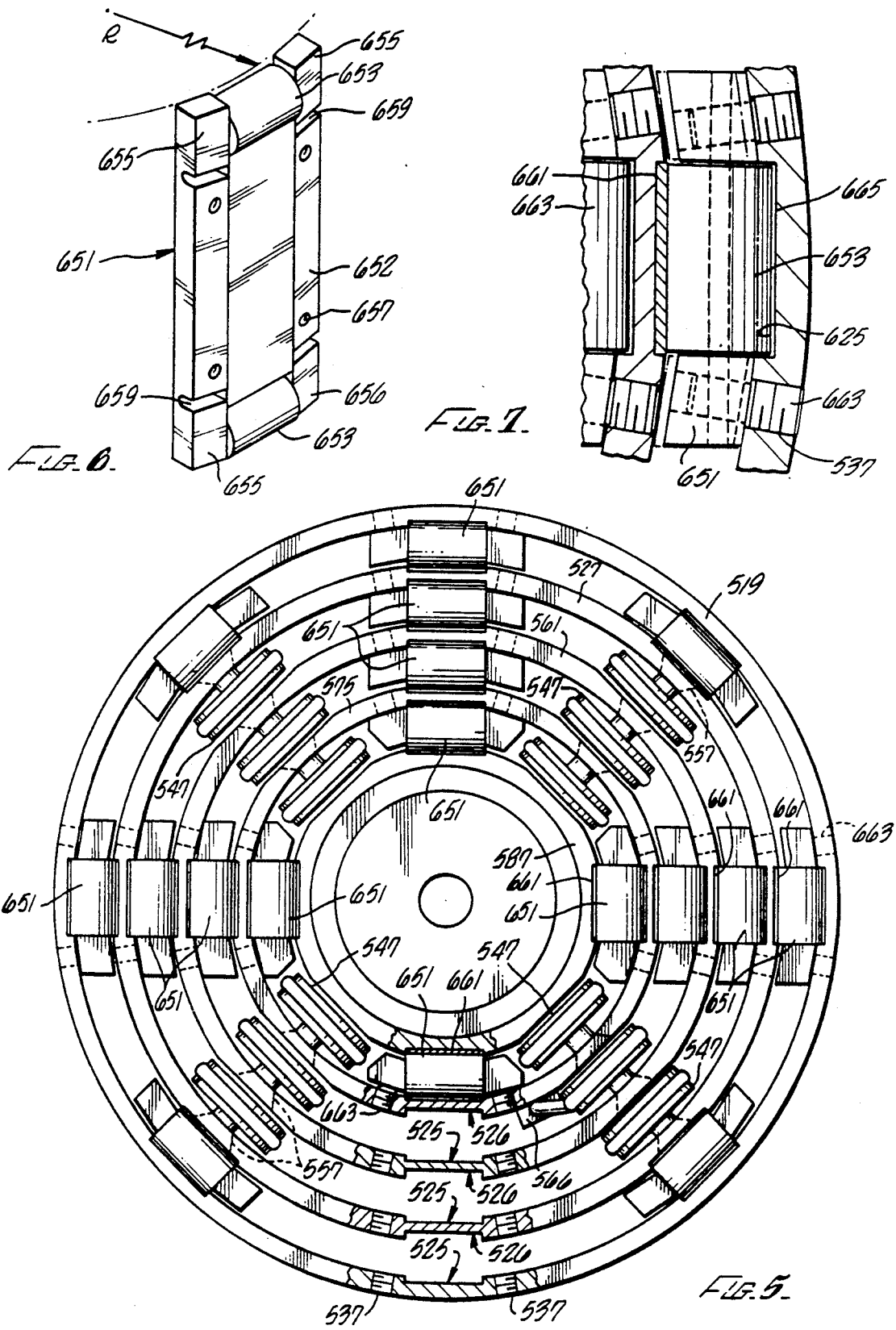

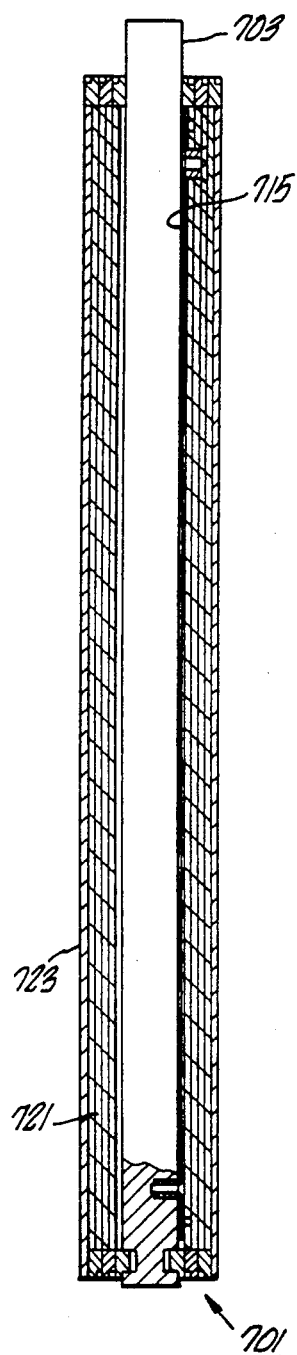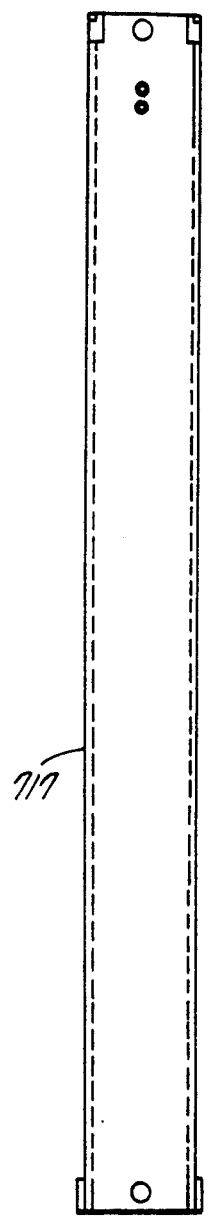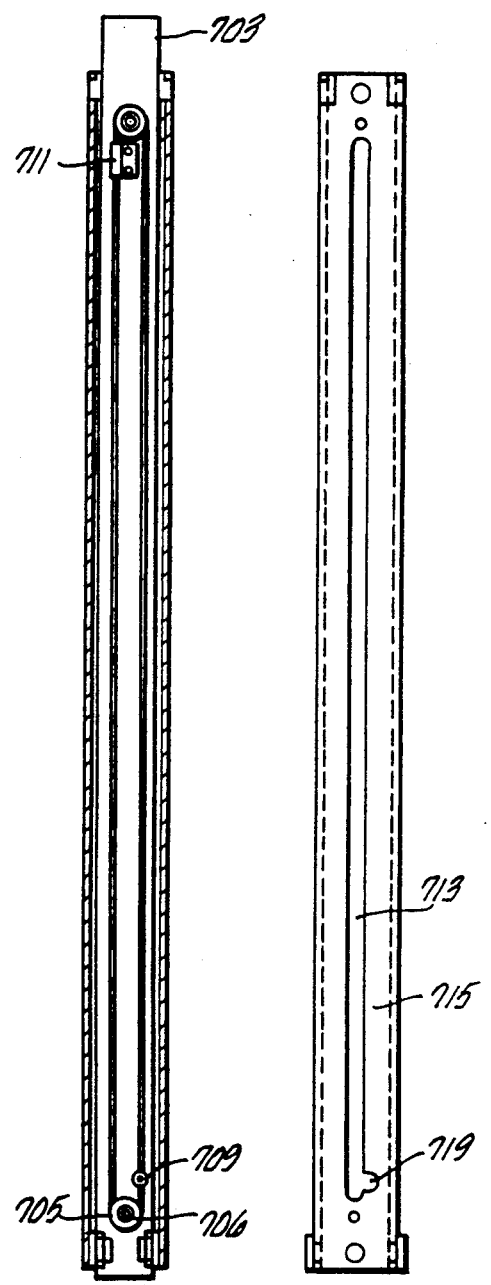
FIG. 12.  FIG. 13.  FIG. 14.  FIG. 15.

CAMERA PEDESTAL

CROSS REFERENCE TO RELATED APPLICATION

A related application, U.S. patent application Ser. No. 591,524, filed concurrently herewith describes a camera dolly which may be used with the camera pedestal described in this application. This related application by inventor Leonard T. Chapman filed on the same day as this application and captioned "Camera Dolly" is fully incorporated herein by reference.

BACKGROUND OF THE INVENTION

The field of the invention is camera supports.

Video, television, and motion picture cameras must often be positioned in a particular way for a video or film sequence. The camera must also often move or sweep in azimuth or elevation, and the entire camera may need to be translated or moved over the ground surface, e.g., to follow an action sequence or obtain a desired cinematographic effect. The camera may also have to be elevated or lowered at certain times.

Generally, all movement of the camera must be uniform and smooth without any bumping, rocking, tilting, vibration or other movement that will cause the recorded images to jump when viewed on a screen. For film sequences where the camera remains stationary, a simple support, e.g., a tripod may be sufficient. When the camera must be moved while operating, more sophisticated camera supports are required.

Ideally, the camera support should be lightweight and easily portable; capable of handling a wide range of loads; and support or move the camera with an absolute minimum of noise, vibration, rocking, tilting, jarring, etc. Depending on its specific application, the camera support may also need to be compact so that it may be used in cramped spaces.

Mobile and stationary camera pedestals are commonly used in television productions. These pedestals allow the camera to be raised and lowered and turned or swept (in azimuth). A tilt or elevation feature may also be included. These mobile units generally have three sets of paired wheels forming a three point support.

Within the pedestal, a mechanism for smoothly and quietly raising and lowering the camera is required. A purely manual system is generally insufficient since the weight of the camera may be substantial and the combination of inertia, friction and the application of the lifting or dropping force by hand will not ordinarily provide the necessary smooth, quiet and accurate positioning. Consequently, counterbalancing or compensation systems have been provided in camera pedestals to compensate for the weight of the camera and facilitate cinematographically acceptable changes in camera height or elevation. For example, Galione, U.S. Pat. No. 4,094,484 describes a pedestal having a self pumping action which provides a counterbalancing force by using compressed gas. Nakazawa et al, U.S. Pat. No. 4,757,970, discloses a television camera pedestal using constant torque springs to compensate for the camera weight. While these and other camera pedestals may have met with varying degrees of technical or commercial success, various disadvantages remain. For example, no known camera pedestal has a compressed gas compensation system which provides a uniform counterbalancing force throughout the full extension of the pedestal column. In addition, mechanical or spring actuated counterbalancing or compensation systems in pedestals are relatively complex and may be noisy in operation and difficult to set for a particular camera weight. These known pedestals also generate perceptible noise, especially during quick movements.

It is advantageous in filming or shooting to be able to position the camera to a very low position. This requires relatively short column sections in telescoping type pedestals. On the other hand, to also have a sufficient maximum height, a relatively large number of column sections is required, heretofore making for a bulky pedestal.

Accordingly, it is an object of the invention to provide an improved camera pedestal which has uniform camera weight compensation throughout the full extension of the pedestal.

It is a further object of the invention to provide such a camera pedestal which is compact yet offers exceptionally low camera positions while still having a large elevation range.

It is yet another object of the invention to provide such a camera pedestal which is exceptionally rigid and steady, quiet in operation, lightweight and portable.

It is a further object of the invention to provide such a camera pedestal which is configured for ease of use by the operator.

It is a further object of the invention to provide such a camera pedestal which uses a single actuator or drive cylinder.

It is yet another object of the invention to provide such a camera pedestal which can be mounted in, and which has a relatively quiet or chainless steering assembly which can engage and operate a steering system of a camera dolly. Other and further objects and advantages will appear hereinafter.

SUMMARY OF THE INVENTION

To these ends, an adjustable camera pedestal includes a hollow tapered drive cylinder having a round cross section area which uniformly expands from the bottom of the cylinder to the top of the cylinder. A piston slidably displaceable within the cylinder has a seal which seals the piston against the inner drive cylinder walls throughout the entire stroke of the piston. A first column section is attached to the piston. A tank with a volume $V_t$ is fillable with a pressurized gas, e.g., compressed nitrogen, and is connected to the drive cylinder which has a volume $V_c$. Where the lower end of the cylinder has a circular cross-section area $A_1$; the upper end of the cylinder has a cross-section $A_2$; the initial gas pressure is $P_i$ and the final gas pressure is $P_f$, the relationship of the areas, volumes, and pressure is $$P_i A_1 = P_f \left( \frac{V_t}{V_t + V_c} \right) A_2.$$

With this relationship, the compensating force acting on the piston remains constant through the stroke of the piston in the drive cylinder. This occurs because even though the gas pressure within the tank and cylinder drops slightly as the piston moves up in the cylinder due to an increase in volume, the area on the piston face on which the gas pressure exerts force increases by a corresponding amount. Consequently, whether the pedestal is near the top or bottom of its range of positions, the compensating force remains the same. This prevents the camera mounted on the pedestal from "drifting" up or down due to an inexact compensating force, i.e., the camera will generally remain substantially exactly as it has been vertically positioned. Preferably, the seal between the piston and cylinder is an expandable O-ring secured about the piston.

To enable the camera pedestal to position the camera at a low position near the floor, a column support extends at least partially through the tank and four displaceable and relatively short column sections are used. A through cylinder projects below the tank to permit the column assembly of the pedestal to achieve very low positions. The tank is generally hemispherical with a flat round top deck surface, to mate and lie co-planer with a deck surface of a camera dolly in which the pedestal can be mounted. The column assembly is eccentrically positioned to one side of or to the back of the tank for improved ergonomics.

The column sections have both inner and outer roller slots. A hardened roller strip is positioned in the outer roller slots. Roller blocks, each having two spaced apart rollers, are disposed in between the column sections. The rollers roll on the outer column section slots. The inner roller slots provide clearance for the rollers. The slots have a channel or rectangular cross-section and are broached or milled into the column sections, as well as the column support. The roller slots permit the use of larger diameter rollers in the allotted space, without increasing the size of the column sections and provide a quiet column assembly.

On the roller blocks, the rollers are rotatably mounted on a pin between spaced apart mounting tabs. Flexing slots are cut into the mounting tabs. After the roller blocks are installed onto the column sections, the roller positions are radially adjusted by engaging set screws in the column sections against the mounting tabs. The mounting tabs are therefore biased to flex radially inwardly to set the proper adjustment of each roller against its associated roller strip. Preferably, four equally spaced apart roller blocks are provided between each column section. The roller blocks have radiused bodies to match with the curvature of the appropriate column sections. Roller blocks are bolted over the slots to reinforce these regions of the column sections. Structural seals or caps further stiffen the column assembly. The spacing between the rollers on each roller block is selected to provide exceptional rigidity to the column assembly without unduly limiting the length of extension of each column section.

Cables and pulleys are provided on the column sections to facilitate uniform extension and contraction of the column sections. The relative extension of each column section is equal to that of the absolute value of the extension of the next lower column section. The absolute value of the movement of the uppermost or fourth column section is 4 times the extension of the bottom or first column section.

A combination dolly/pedestal camera support includes a dolly having a chassis with a pedestal receptacle, 4 legs pivotally attached to the dolly chassis and having dual sets of wheels extending from each leg on which the dolly rolls. A pedestal having a compressed gas tank and a column assembly joined to one side of the gas tank is supportable in the pedestal receptacle on the dolly. A steering wheel on the pedestal assembly can be linked to a steering system in the dolly. The front legs of the dolly can be laterally extended from the dolly chassis, and the rear legs brought close together, to simulate a 3-point suspension. Rubber tires on the dolly can absorb small protrusions or depressions in the floor or supporting surface for additional stability. The dolly legs can be placed in other configurations to provide a mobile dolly/pedestal unit adaptable to varying requirements, e.g., running on track or passing through narrow openings. Varying the leg positions varies the "tilt line" of the dolly/pedestal unit, i.e, the perpendicular distance from the support points to the center of gravity.

BRIEF DESCRIPTION OF THE DRAWINGS

Other objects and features of the present invention will become apparent from the following detailed description taken in connection with the accompanying drawings. It is to be understood, however, that the drawings are designed for the purpose of illustration only and are not intended as definition of the limits of the invention.

In the drawings, wherein similar reference characters denote similar elements throughout the several views:

FIG. 1 is a side elevation view of the present camera pedestal installed in a camera dolly.

FIG. 2 is a perspective view of the pedestal;

FIG. 4 is a side view fragment in part section of the column assembly of the pedestal;

FIG. 5 a top view in part section of the column assebly with the structural shields removed of the column assembly;

FIG. 6 is a perspective view of the roller blocks shown in FIG. 5;

FIG. 7 is an enlarged section view fragment of the roller blocks shown in FIG. 5;

FIG. 12 is a side elevation view of a second embodiment of the telescoping steering drive tube assembly of FIGS. 8 and 9;

FIG. 13 is a side elevation view of a second tube of the assembly of FIG. 12;

FIG. 14 is a side elevation view of the inner shaft thereof; and

FIG. 15 is a side elevation view of a first tube of the assembly of FIG. 12.

DETAILED DESCRIPTION OF THE DRAWINGS

Figure 3:
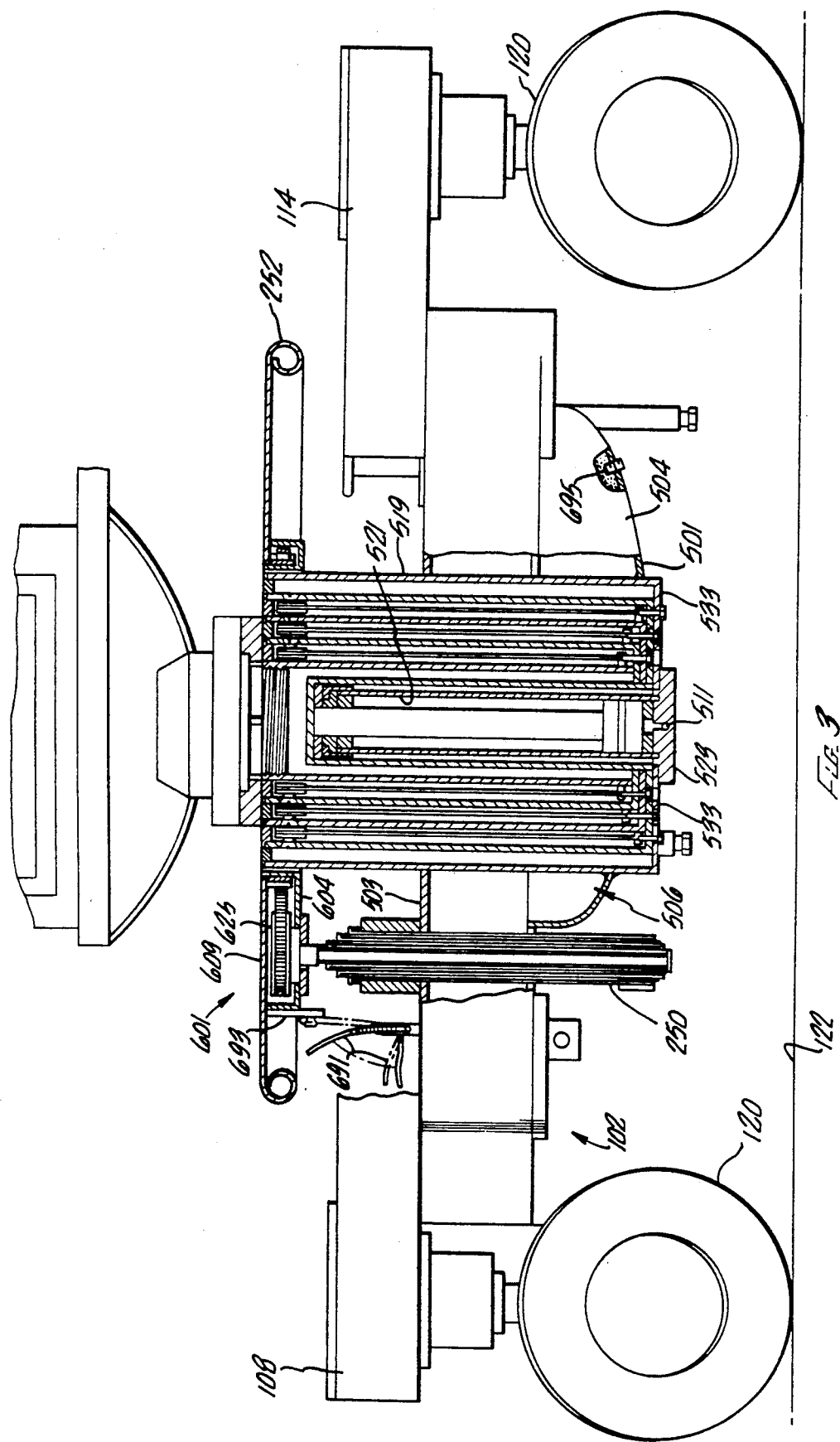
FIG. 3 is a side elevation view in part section of the pedestal as mounted in a dolly.

As shown in FIG. 1, a video, television, or motion picture camera 50 is mounted on top of a pedestal 101 having a steering wheel 252, telescoping steering drive tube 250 and a column assembly 103. The pedestal 101 is mounted on a dolly 102 having a chassis 104 with four articulating legs including left side legs 108 and 114. Wheels 120 are attached to the legs and roll on the floor or ground surface 122 or on track rails.

As shown in FIG. 2, the pedestal 101 can be removed from the dolly 102 and stand on its own three legs 515, which are threadably adjustable in length. The pedestal, by itself, as shown in FIG. 2 can raise and lower the camera 50. When the pedestal 101 is used as shown in FIG. 2, the steering drive tube 250 remains with the dolly 102.

Referring to FIGS. 3 and 4, the pedestal 101 is provided with a camera mounting plate 51. A pedestal tank weldment 501 has a flat tank deck 503 and a generally hemispherical tank body 504. A column support 519 is generally cylindrical and has a circular plate column support base 533. The column support 519 is welded to the tank deck 503 and tank body 504 and is an integral part of the tank weldment 501 which forms a gas-pressure-tight container.

As shown in FIG. 4, centrally located within the column support 519 is a drive cylinder 521 having an end cap 523. The drive cylinder 521 has a round cross section which uniformly tapers outwardly from the lower end of the cylinder 521 to the upper end thereof. In a preferred embodiment, the drive cylinder 521 is approximately 12 inches long with a base diameter of 2.0000 inches linearly increasing to a diameter of 2.0080 inches at its top. This increase in the drive cylinder bore or diameter compensates for decreasing gas pressure as the pedestal is elevated, as described further below. The drive cylinder tapered diameter can be increased for additional load carrying capacity.

A piston 543 having a seal 545 is axially slidable or displaceable within the drive cylinder 521. A gas lead tube 511 connects the tank volume 506 to the drive chamber 544 below the piston 543. The ambient chamber 546 above the piston 543 in the drive cylinder 521 is vented to the outside environment. The seal 545 is preferably an O-ring PRP 568-326. The O-ring maintains a seal between the piston 543 and the drive cylinder 521 along the entire stroke through the drive cylinder 521, e.g., the seal 545 seals against both a 2.0000 bore and a 2.0080 bore. Felt end stops 552 and 553 are provided at each end of the cylinder bore 521 to quiet and cushion the movement of the piston 543 at the lower and upper ends of the drive cylinder 521. FIG. 4 shows the piston 543 at its bottom position resting against the lower felt end stop 552. Only the tank 506, lead tube 511, and the variable volume drive chamber 544 (which are all interconnected) contain pressurized gas.

A first column section 527 has a core cylinder 535 secured to the top of a drive rod 548 attached to the piston 543. The outer walls 528 of the first column section 527 are joined to the core cylinder 535 by an annular first column section base 529. The first column section base 529 may be welded to the tubular outer walls 528 and core cylinder. The bottom surface of the first column section base 529 rests within the fixed column support 519 when the column assembly 500 is in the down or collapsed condition. A second column section 561 has an integral base 564 and is nested concentrically within the first column section 527. Similarly, a third column section 575 having an integral third column section base 588 is nested within the second column section 561, and a fourth or top column section 587 is nested within the third column section 575. In a preferred embodiment, the column support 519 is 10.0 inches in diameter and the first, second, third and fourth or final column sections are respectively 8.50, 7.00, 5.50 and 4.00 inches in diameter. However, it should be noted that although their sizes are described in terms of a diameter, the first through fourth column sections are somewhat octagonal, rather than purely round, as shown in FIG. 5.

A cylinder end cap 593 is threaded onto the upper end of the drive cylinder 521. A bushing 595 held in place by the cylinder end cap 593 slidably supports the drive rod 548. A steering frame assembly 601 is rigidly attached to the final column section 587 only. The steering frame assembly 601 is not connected to the other sections although it may rest on top of the ends of the other column sections with the column in the collapsed or down position as shown in FIG. 4.

Referring to FIGS. 4 and 5, pulleys 547 are attached to the inside surfaces of the first, second and third and final column sections 527, 561 and 575 by flathead pulley mounting bolts 557. The pulley mounting bolts 557 have countersunk heads and engage threaded bearing centers within the pulleys 547. A first section cable 549 has a cable stud 534 extending through the column support base 533 and secured thereto by lock nuts 555. The cable stud 533 passes through clearance holes 513 in the first section base 529 and the base of the column support 533. The first column section cable 549 passes over the pulley 547 attached near the top of the first column section 527 and terminates in a block 566 attached to the outer surface of the lower end of the second column section 561.

Similarly, a second column section cable 554 has an end stud 558 which passes through clearance holes 514 in the bases 564, 529 and 533. Lock nuts 555 secure the end stud 556 to the base 529 of the first column section, i.e., they prevent the stud end 556 (and all of the stud ends) from pulling out of the base 529. The second column section cable 554 passes over a pulley 547 on the top of the second column section 561 and terminates in a block 568 attached to the outside surface of third column section 575, adjacent its base.

Similarly, a third column section cable 556 has a stud end 562 passing through the first, second and third column section bases 588, 564, and 529, and secured by lock nuts 555. Similar to the other column sections, the third column section cable 556 passes over a pulley 557 on the inside wall of the third column section 575 and terminates in a block 574 attached near the lower end of the fourth column section 587. The fourth column section 587 has no base or end surface and is similar in shape to an octagonal tube.

FIG. 4 being a cross section illustrates two pulley end cable systems for each column section. However, as is shown in FIG. 5, each column section has four pulley/cable assemblies.

The cables may be terminated in the blocks by passing the cable end through a hole in the block and crimping a sleeve over the cable to prevent it from pulling through the hole in the block. The lock nuts 555 are used for adjusting the preset in the cables and to secure the stud ends of the cables into the bases. Clearance holes are provided through the base of the column support 519 around the lock nuts 555 on the stud ends of the second and third column section cables.

Referring to FIG. 5, the column support 519 has four inner roller slots 525 equally spaced around its circumference, i.e., at 90° intervals. The fourth column section 587 has four outer roller slots 526 equally spaced around its outside surface. The first, second and third column sections 527, 561 and 575 have both inner roller slots 525 and outer roller slots 526 aligned with or overlying their inner roller slots 525, and also aligned with the roller slots in the column support 519 and fourth column section 587. The inner and outer roller slots 525 and 526 may be broached along the full length of the four column sections and the column support.

Referring to FIGS. 5 and 6, equally spaced between the pulleys 557 are roller blocks 651, i.e. with four roller blocks in between each column section. Each roller block 651 has a body 652 and rollers 653 mounted on a pin 666 between mounting tabs 655. Four threaded roller block mounting holes 657 are provided in the body 652. Adjustment slots 659 are provided at the base of each mounting tab 655, to allow for a small amount of flexing of the tabs 655 for adjustment of the engagement of the rollers 653 during assembly. Each roller block body 652 is radiused on its inner and outer surfaces to match the specific position the roller block will occupy and the column assembly. As shown in FIG. 5, the roller blocks 651 are provided with four different curvatures R. The rollers 653 have an internal bearing which mounts on the pin 666 extending through the mounting tabs 655. A hardened steel strip or runner 661 is secured into the outer roller slots 526 by a single fastener at the top of each of the roller slots. The other or bottom end of the strip 661 is held into the slot 526 (after assembly) by the rollers 653.

Referring now to FIG. 7, the roller blocks 651 are tightly screwed or bolted onto their respective column sections through the threaded mounting holes 657, at the top end of each column section and the column support. The roller body blocks 652 are bolted into position over the slots in the column sections and act as stiffening members. Set screws 663 are then progressively adjusted around the column assembly 500 forcing the mounting tabs 655 slightly inwardly to adjust the rolling engagement of the rollers 653 against the strips 661 in the adjacent section. The rollers 653 roll only on the strip 661. A small gap 665 separates the back of the rollers 653 from the inner roller slots 525. By providing the inner and outer slots 525 and 526, relatively large size rollers 653 may be used without requiring an excessively large diameter column assembly. The relatively large size of the rollers 653 provides a quiet and smooth operation as well as a highly rigid column assembly.

Figure 11:
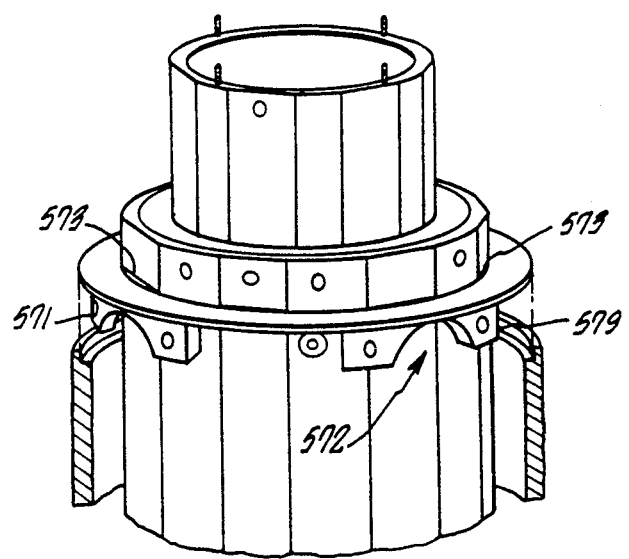
FIG. 11 is a perspective view of a structural shield positioned in between column sections of the pedestal.

Referring to FIG. 11, to increase the stiffness of the column assembly, and to cover over the interstitial openings between the column sections, annular structural shields 569 are provided in between the column sections. Mounting blocks 571 of the structural shields 569 have pulley clearance openings 572 and are bolted to the column sections. Felt wipers 573 on each structural shield 579 rubs against the strips 661 as the column assembly moves, to keep the strip clean and further dampen any vibration.

Figure 8:
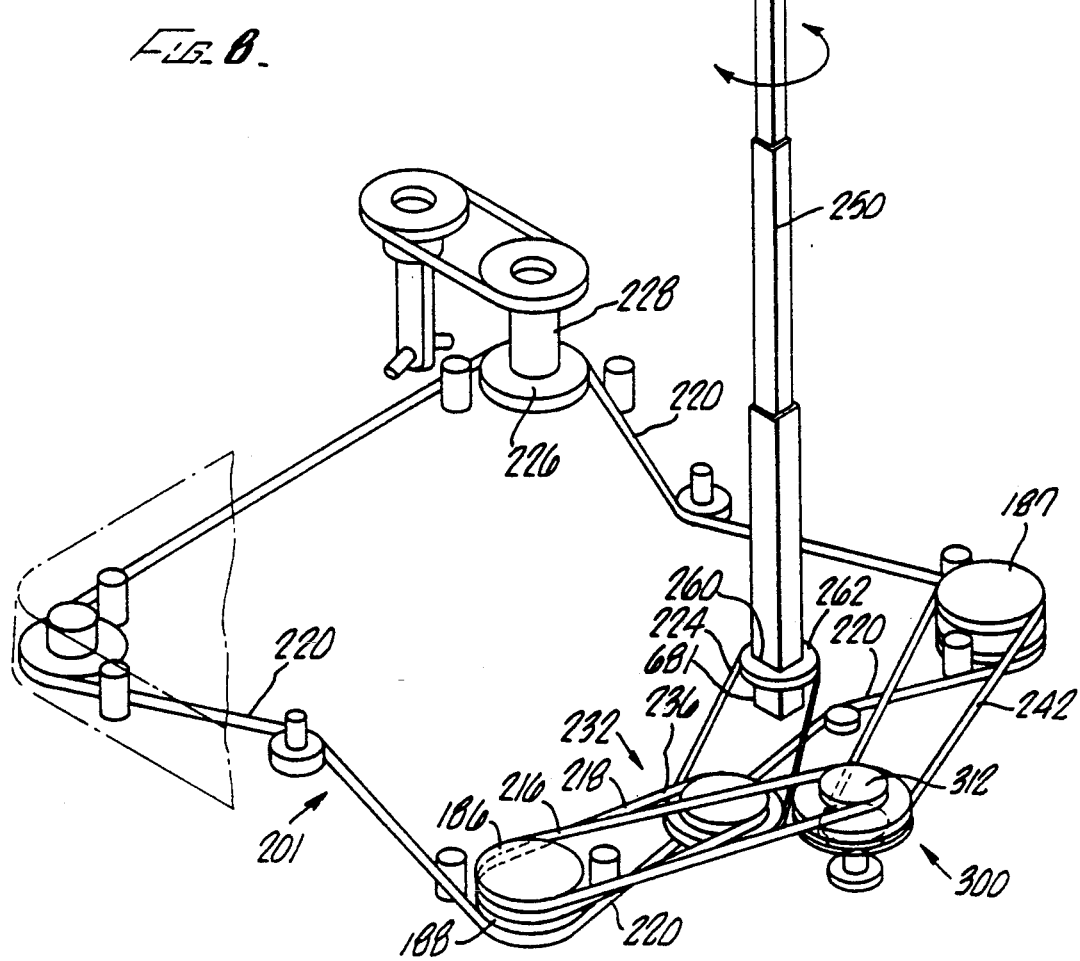
FIG. 8 is a schematic illustration of the steering assembly of the pedestal linked to a dolly steering system.
Figure 9:
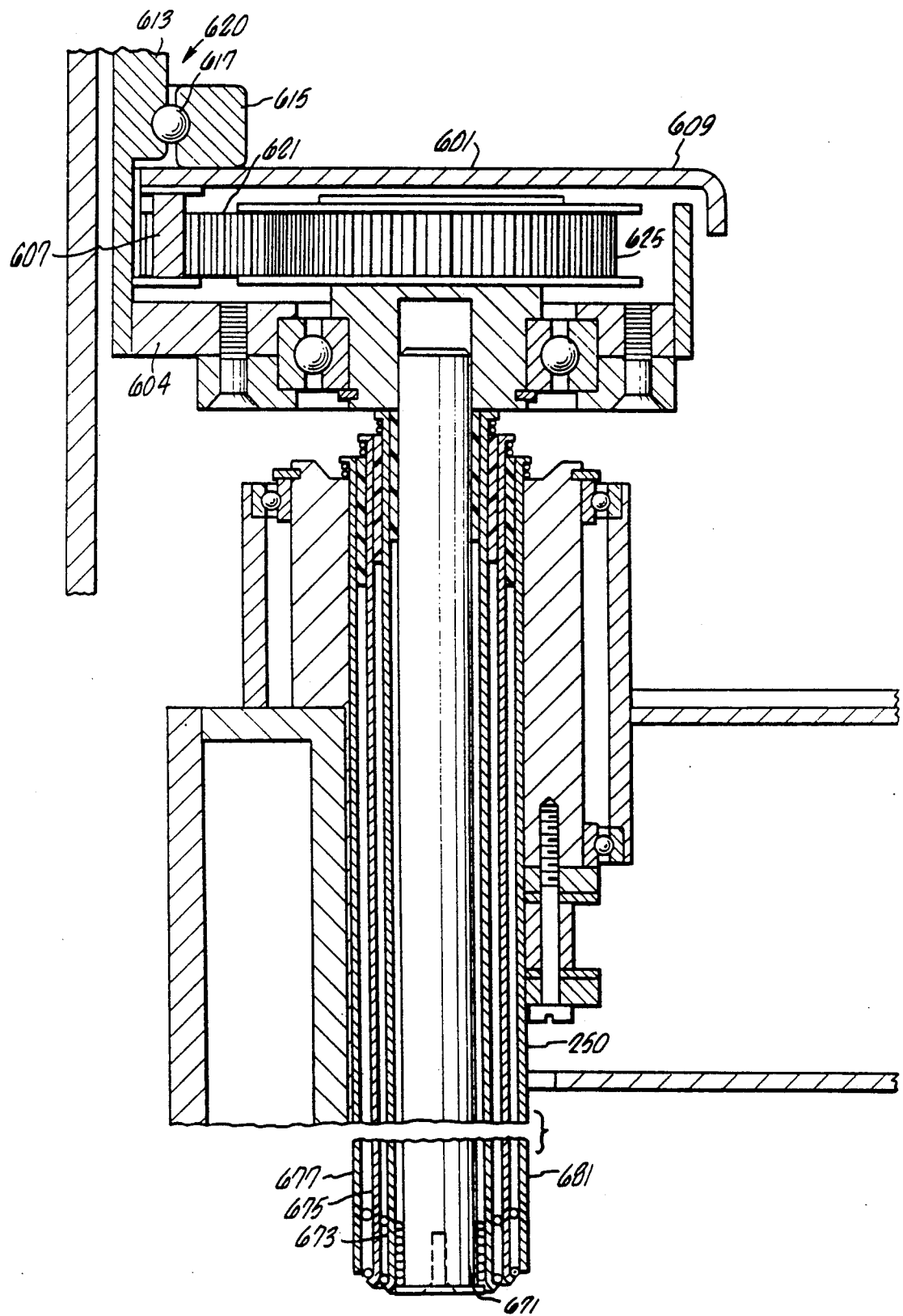
FIG. 9 is an enlarged section view fragment of the pedestal steering assembly.
Figure 10:
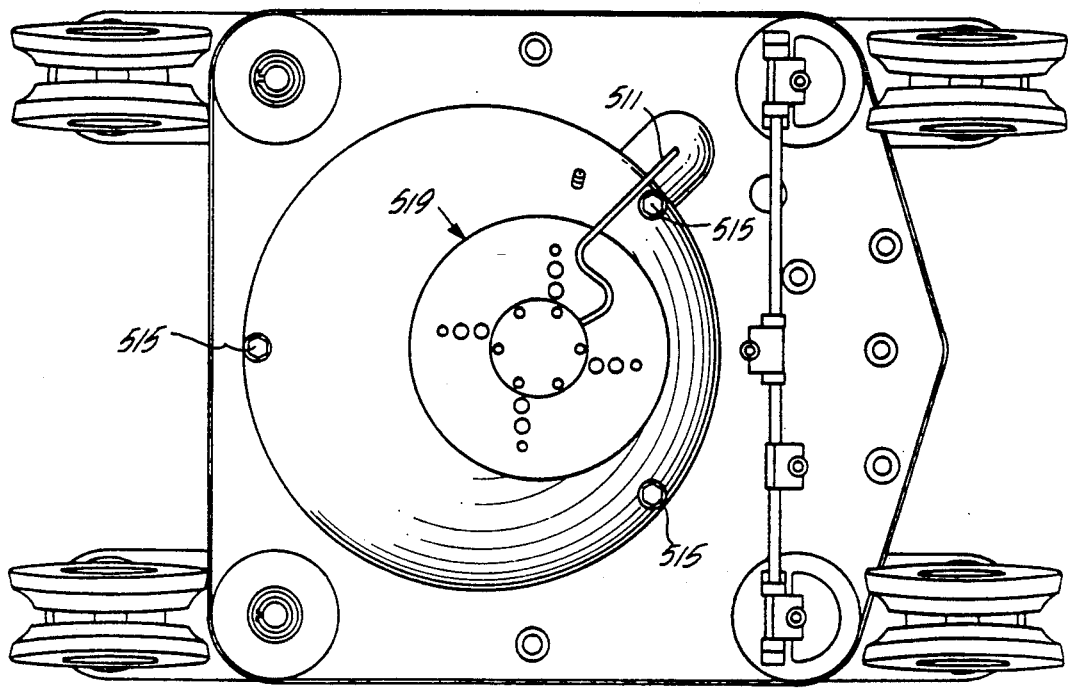
FIG. 10 is a bottom perspective view of the pedestal supported by the dolly.

Referring to FIGS. 3, 8 and 9, a steering assembly 601 includes a steering frame chassis 603. A steering wheel plate 609 having a rubber coated steering rim or wheel 252 is attached to an outer bearing race frame 615 and a steering sprocket 607. The plate 609 is attached to the frame chassis 603 through an inner bearing frame section 613 on the frame chassis 603. The steering frame chassis 603 is rigidly attached to the fourth column section 587, and consequently cannot rotate. The steering wheel plate 609 carrying the steering wheel 252 and the steering sprocket 607 is rotatable with respect to the steering frame chassis 603 by virtue of the bearing 620 formed by the outer bearing race frame 615, the inner bearing frame section 613 and balls 617, preferably made from nylon for increased noise reduction in operation. Rather than fill the entire bearing 620 with nylon balls, a combination of teflon spacers and nylon balls may be used.

The spacer in the bearing is preferably a teflon o-ring section that slides in the race formed by the bearing frames 613 and 615. This reduces the number of balls required in this relatively large diameter bearing and provides good bearing efficiently for handling intermittent fast spin or rotation. The rolling surfaces on frames 613 and 615 are ground polished.

A lower cover plate 604 is attached to the frame chassis 603. Rotatably mounted on the lower cover plate 604 is an idler sprocket 623 (FIG. 8) and a steering drive sprocket 625. A steering drive belt, preferably a Gates Rubber Co. POLYCHAIN GT toothed belt drivingly loops around and engages the steering sprocket 607 idler sprocket 623 and the steering drive sprocket 625. Accordingly, when the steering wheel 252 is turned, the steering sprocket 607 turns with it and thereby turns the steering drive sprocket 625. The steering sprocket 607 preferably has 112 teeth and may be a Gates 8M 112 sprocket with the steering drive sprocket 625 having 28 teeth, e.g., a Gates AM 28 sprocket. If the pedestal 101 will be used with the camera dolly 102, the sprockets 607 and 625 must be selected in coordination with the steering system of the dolly, to maintain angular correspondence between movement of the steering wheel 252 and the dolly wheels.

Referring specifically to FIG. 9, the telescoping steering drive tube assembly 250 comprises four nested square tube sections 671, 673, 675 and 677 with rubber o-rings provided between the sections. These sections may alternatively be separated by Teflon spacer inserts and have open cell neoprene stops between the sections for damping. The sections 671, 673, 675 and 677 slide in a telescoping manner to follow the vertical movement of the steering assembly 601 on top of the pedestal column. In the embodiment shown in FIG. 9, the four sections of the telescoping steering drive tube assembly 250 do not necessarily extend uniformly or progressively, as do the column sections.

In an alternate embodiment shown in FIG. 12, a cable and pulley system may be used in the telescoping steering drive tube 250 to achieve uniform movement. FIGS. 12, 13, 14 and 15 illustrate an alternate embodiment of the telescoping steering drive tube assembly 205. As shown therein, the drive tube assembly 701 has an inner shaft 703 having pulleys 705 mounted thereto with screws 706 threaded into the inner shaft 703. A cable loop 707 loops around the pulleys 705 and terminates at clamp screw 709, also threaded into the inner shaft 703. Since the lifting forces involved in the telescoping drive tube assembly 701 are on the order of 1.0 lbs., the cable loop 707 may be made of 0.025 diameter fishing line with 40 lb. test. An L-shaped mounting tab 711 is secured to the cable loop 707 adjacent the upper pulley 705 and extends through a travel slot 713 in the first tube 715 (FIG. 15). As shown in FIG. 12, the first tube 715 slides over the inner shaft 703. A second tube 717 slides over the first tube 715 and is attached to the mounting tab 711. An access slot 719 is provided at the bottom of the first tube 715 to provide for installation of the clamp screw 709. As is shown in FIGS. 12–15, if the second tube 717 is considered to be fixed in position, and the inner shaft 703 is lifted, it will lift the first tube 715 at one-half the rate of the inner shaft 703. The configuration illustrated in FIGS. 13–15 is repeated for the third and fourth tubes 721 and 723. Specifically, to accomplish the desired movement between the first tube 715 and the second and third tubes 717 and 721, a similar pulley and cable loop configuration (as is shown on the inner shaft 703 in FIG. 14) is provided on the first tube 715. Correspondingly, the second tube 717 has a travel slot 713 permitting a mounting tab 711 on a cable loop 707 on the first tube 715 to be connected to the third tube 721. Likewise, this configuration is duplicated once again for the fourth tube 723. In each instance, the pulley and loop arrangement is positioned on a different face of the square tubes to avoid excessive build up in width. A total of three cable loop and pulley sets are used. The assembly shown in FIG. 12 causes the tubes forming the steering drive tube assembly 701 to extend and contract uniformly, in the same manner as the column sections in the column assembly.

The steering tube drive assembly sections 671, 673, 675 and 677 of FIG. 9 may alternatively be mechanically linked to their corresponding column section which will pull up the steering drive tube section, causing the telescoping steering drive 250 to extend in the same manner as the column assembly. The telescoping steering drive 250 and 701 are constructed to extend and contract smoothly, quietly, and with a minimum of force in order to not disturb the quiet and smooth extension of the column assembly.

Turning to FIG. 8, the steering assembly 601 is shown engaged to the steering system of the camera dolly described in the U.S. patent application Ser. No. 591,524. The base 681 of the steering drive tube 250 extends through and drivably engages a sprocket within the camera dolly, thereby linking the steering assembly 601 of the pedestal to the steering system in the camera dolly. A set screw or similar quick release device secures the inner shaft of the telescoping steering drive tube assembly to the pedestal steering assembly.

As shown in FIG. 3 a latch assembly 691 is provided on the tank deck. A hook 693 extends downwardly from the lower cover plate 604. With the column assembly fully lowered, the hook engages the spring loaded latch assembly 691 and prevents the column assembly from extending without first releasing the latch assembly 691.

In operation, the camera is attached to the pedestal through the mounting plate 51. Compressed gas, preferably nitrogen, is provided through the delivery tube 511 into the tank volume 506. Sufficient gas is delivered until the pressure acting on the piston 543 causes the column assembly to be urged upwardly with the force counterbalancing the weight of the camera. The column assembly can then be easily raised or lowered, notwithstanding the weight of the camera, by lefting hand action on the steering wheel 252. Additional small weights can be placed on the steering wheel plate 609 if desired to aid in counterbalancing. A relief valve 695 prevents overpressurization. A pressure gauge 509 on the tank deck 503 indicates the gas pressure.

In operation, compressed gas is supplied to the tank 506, and it also concurrently flows through the lead tube 511 to the drive chamber 544. Tank 506 and drive chamber 544 are essentially always at the same gas pressure. The gas pressure in the drive chamber exerts a force $F_1$ on the piston 543 cross section. For example, if the gas pressure is 100 p.s.i., and the cross section area of the piston 543 (at the bottom of the stroke as shown in FIG. 4) is 3.24 in$^2$ (i.e., a 2.00 in diameter piston), the force $F_1$ = 100 p.s.i. × 3.14 in$^2$ = 314 lbs. Neglecting friction and column component weight, this 314 lb. force will counterbalance a camera load weight of 314/4=78.5 lbs., since the column assembly has a 1:4 drive ratio.

The tank volume 506 is fixed and is connected to the drive chamber 544 i.e. the volume of the drive cylinder 521 below the piston 543. In addition, after the tank volume 506 is charged with compressed gas, the compressed gas source (e.g. a nitrogen bottle) is removed. As the piston 543 is driven upwardly by Force $F_i$, the volume containing the compressed gas increases. Specifically, the volume of the drive chamber 544 increases. Consequently, the gas pressure drops (as determined by the gas laws) as the piston 543 rises. In conventional pedestals this results in a drop in the counterbalancing force from the bottom to the top of the piston stroke. This variable counterbalancing force makes it very difficult to accurately maintain camera position at a given height.

In the present pedestal, drive cylinder 521 tapers outwardly from bottom to top. As the piston 543 rises, the seal 545 expands radially outwardly effectively increasing the cross section area of the piston on which the compressed gas exerts pressure. Hence, towards the top of the drive cylinder 521, the drop in gas pressure is offset by the increase in "piston" surface area to the extent that product of the gas pressure × surface area and the resulting counterbalancing force is substantially constant. Thus the force $F_1$ is substantially constant throughout the stroke. Therefore, the camera remains properly counterbalanced at all elevations of the pedestal and no "drift" or positioning difficulties are encountered.

As the piston 543 is driven upwardly by the gas pressure, it carries with it the drive rod 548 and the core cylinder 535 which is integral with the entire first column section 527. As this occurs the base 529 of the first column section 527 lifts all of the other column sections 561, 575 and 587. Consequently, the pulleys 547 which are fixed to the column sections move up. The cables 549, 554 and 556 (four on each section) then lift the next inner column section by equal amounts such that the column assembly 500 uniformly extends with all sections moving up by equal relative distance. In absolute terms, the fourth column section 587 extends 4 times the extension of the first column section 527, with the second and third column sections 561 and 575 extending 2 and 3 times thereof, respectively. The tank weldment has an operating maximum pressure of 300 p.s.i. enabling to pedestal to counterbalance up to about 220 lbs.

Since the column support 519 is offset (to the "back") of the tank weldment (FIG. 3), the steering drive sprocket 625 and the steering drive tube 250 can be placed inwardly and away from the steering wheel 252. This allows the operator to grip the steering wheel 252 from various angles or directions without interference from the drive sprocket 625, tube 250 or lower cover plate 604. If the column support 519 were centered in the tank weldment, the drive sprocket 625 would have to be very close the steering wheel 252 and could interfere with the operators grip.

Thus, while several embodiments have been shown and described, it will be obvious to those skilled in the art that various alterations and additions may be made to the apparatus without deviating from the spirit and scope of the invention.

I claim:
1. An adjustable camera pedestal comprising:
   a hollow, tapered cylinder having a first end and a second end having a cross section area greater than that of said first end;

a solid cylindrical piston slidably displaceable within said cylinder and having a first piston end facing a drive chamber within said tapered cylinder for containing compressed gas;

a seal on said piston expandable to substantially seal said piston against said tapered wall at all positions between said first and second ends of said cylinder; and at least one column section attached to said piston.

2. A camera support pedestal comprising:

a tank having a volume $V_T$ for containing a pressurized medium;

a cylinder having a volume $V_c$ connectable to said tank, said cylinder having a lower end with a first circular cross section area $A_1$ and an upper end having a second cross section area $A_2$, said second cross section area being greater than said first cross section area, said cylinder having a cylinder bore uniformly tapering radially outwardly from said first cross section area to said second cross section area;

a piston axially displaceable by a stroke relative to said tank having a pressure $P_i$ when said piston is adjacent said first cross section area and a pressure $P_f$ when said piston is adjacent said second cross section area;

a seal for sealing said piston and cylinder entirely along said stroke; and a column member attached to said piston and axially displaceable from said cylinder.

3. The pedestal of claim 2 wherein $$P_i A_1 = P_f \frac{V_T}{V_T + V_c} A_2.$$

4. A camera pedestal comprising:

a tank for containing compressed gas;

a column base extending outwardly of said tank;

a pneumatic cylinder having a bore uniformly tapering from a first diameter at a lower cylinder end to a second diameter at an upper cylinder end, said second diameter larger than said first diameter;

a piston axially slidable within said cylinder;

a seal secured around said piston for sealing the piston and cylinder;

a first column section linked to said piston and extendible from said column support.

5. The pedestal of claim 4 wherein said column base is eccentrically positioned on said tank.

6. The camera pedestal of claim 4 further comprising a structural shield attached to the column support and substantially surrounding the first column section.

7. A camera pedestal comprising:

a tank for containing compressed gas;

a column support extending at least partially through said tank;

a pneumatic cylinder having a bore uniformly tapering from a first diameter at a lower cylinder end to a second diameter at an upper cylinder end, said second diameter larger than said first diameter;

a piston axially slidable within said cylinder;

a seal secured around said piston for sealing the piston and cylinder;

a first column section linked to said piston and extendable from said column support; and at least four spaced apart roller blocks disposed substantially between said first column section and said column base.

8. The pedestal of claim 7 wherein each said roller block comprises a body and a roller adjacent each end of the roller block mounted substantially between two spaced apart mounting tabs, with flexing slots in said body adjacent said mounting tabs.

9. The pedestal of claim 7 wherein said first column section has a generally cylindrical outside surface and roller slots axially extend along said outside surface.

10. The pedestal of claim 9 further comprising a hard runner strip disposed in said roller slot.

11. The pedestal of claim 7 further comprising set screws associated with said roller block for adjusting the engagement of said roller against said first column section.

12. A camera pedestal comprising a plurality of telescoping column sections of progressively smaller diameter, said column sections each having inner and outer surfaces with roller slots axially extending on the inner and outer surfaces of the column sections;

a plurality of rollers for rolling within the roller slots, between adjacent column sections; and means for uniformly extending and contracting the column sections.

13. A camera pedestal comprising:

a tank for containing compressed gas;

a column support extending at least partially through said tank;

a pneumatic cylinder having a bore uniformly tapering from a first diameter at a lower cylinder end to a second diameter at an upper cylinder end, said second diameter larger than said first diameter;

a piston axially slidable within said cylinder;

a seal secured around said piston for sealing the piston and cylinder;

a first column section linked to said piston and extendable from said column support; and a second column section extendable from said first column section, a third column section extendible from said second column section and a fourth column section extendible from said third column section.

14. A camera pedestal comprising:

a tank for containing compressed gas, the tank having a generally hemispherical bottom;

a column support extending at least partially through said tank bottom;

a pneumatic cylinder having a bore uniformly tapering from a first diameter at a lower cylinder end to a second diameter at an upper cylinder end, said second diameter larger than said first diameter;

a piston axially slidable within said cylinder;

at least one seal secured around said piston for sealing the piston and cylinder; and a first column section linked to said piston and extendable from said column support.

* * * * *